United States Patent
Heist et al.

(10) Patent No.: US 10,378,888 B2
(45) Date of Patent: Aug. 13, 2019

(54) DEVICE AND METHOD FOR SPATIALLY MEASURING SURFACES

(71) Applicants: Fraunhofer-Gesellschaft zur Förderung der angewandten Forschung e.V., München (DE); Friedrich-Schiller-Universität Jena, Jena (DE)

(72) Inventors: Stefan Heist, Jena (DE); Gunther Notni, Jena (DE); Kevin Srokos, Weimar (DE); Peter Lutzke, Jena (DE); Ingo Schmidt, Jena (DE); Peter Kühmstedt, Jena (DE)

(73) Assignees: FRIEDRICH-SCHILLER-UNIVERSITAET JENA, Jena (DE); FRAUNHOFER-GESELLSCHAFT ZUR FOERDERUNG DER ANGEWANDTEN, Munich (DE)

( * ) Notice: Subject to any disclaimer, the term of this patent is extended or adjusted under 35 U.S.C. 154(b) by 0 days.

(21) Appl. No.: 15/571,803

(22) PCT Filed: May 4, 2016

(86) PCT No.: PCT/EP2016/060073
§ 371 (c)(1),
(2) Date: Nov. 3, 2017

(87) PCT Pub. No.: WO2016/177820
PCT Pub. Date: Nov. 10, 2016

(65) Prior Publication Data
US 2018/0149472 A1 May 31, 2018

(30) Foreign Application Priority Data
May 5, 2015 (DE) .......... 10 2015 208 285

(51) Int. Cl.
*G01B 11/24* (2006.01)
*G01B 11/25* (2006.01)

(52) U.S. Cl.
CPC ........ *G01B 11/2545* (2013.01); *G01B 11/254* (2013.01); *G01B 11/2518* (2013.01)

(58) Field of Classification Search
CPC ............. G01B 11/2545; G01B 11/254; G01B 11/2518; G01B 11/2513; H04N 13/0253; G06T 7/521
(Continued)

(56) References Cited

U.S. PATENT DOCUMENTS

| 4,871,256 A | * | 10/1989 | Grindon | ............... G01B 11/245 356/610 |
| 5,307,152 A | * | 4/1994 | Boehnlein | ............... G06T 7/521 250/237 G |

(Continued)

FOREIGN PATENT DOCUMENTS

| DE | 19928341 A1 | 1/2001 |
| DE | 10355010 A1 | 6/2005 |

(Continued)

OTHER PUBLICATIONS

International Preliminary Report on Patentability issued in PCT/EP2016/060073, dated Nov. 7, 2017, 14 pages with English translation.

(Continued)

*Primary Examiner* — Hoa Q Pham
(74) *Attorney, Agent, or Firm* — Faegre Baker Daniels LLP

(57) ABSTRACT

A device, for spatially measuring surfaces, includes a projector for projecting patterns into an object space, two cameras for recording pictures of a surface in the object space, and a control and evaluation unit for activating the (Continued)

cameras and evaluating the pictures. The projector includes a light source, a projection lens, at least one rotatably arranged pattern structure, and a drive for rotating the at least one pattern structure. The control and evaluation unit to: activate the cameras for simultaneously recording a picture at each of a plurality of successive points in time; identify corresponding points in the picture planes of the cameras, by way of evaluating a correlation function between the sequences of brightness values acquired for potentially corresponding points and maximizing a value of the correlation; and determine spatial coordinates of surface points by way of triangulation on the basis of the identified corresponding points.

15 Claims, 5 Drawing Sheets

(58) Field of Classification Search
USPC .................................................. 356/601–623
See application file for complete search history.

(56) References Cited

U.S. PATENT DOCUMENTS

| | | | |
|---|---|---|---|
| 6,341,016 B1* | 1/2002 | Malione | G01B 11/2509 345/419 |
| 6,542,250 B1 | 4/2003 | Michaelis et al. | |
| 7,548,324 B2* | 6/2009 | Lee | G01B 11/25 356/605 |
| 7,724,379 B2* | 5/2010 | Kawasaki | G01B 11/2509 356/603 |
| 2003/0007159 A1 | 1/2003 | Franke et al. | |
| 2004/0174539 A1 | 9/2004 | Tyczka et al. | |
| 2007/0057946 A1* | 3/2007 | Albeck | G01B 11/2513 345/427 |
| 2009/0169095 A1* | 7/2009 | Zhuang | G01B 11/2545 382/154 |
| 2012/0092461 A1 | 4/2012 | Fisker et al. | |
| 2014/0063204 A1* | 3/2014 | Siercks | G01B 11/2545 348/50 |
| 2014/0078264 A1 | 3/2014 | Zhang | |
| 2016/0202051 A1* | 7/2016 | Heist | G01B 11/2513 356/610 |

FOREIGN PATENT DOCUMENTS

| | | |
|---|---|---|
| DE | 102006001634 B3 | 3/2007 |
| DE | 102006049695 A1 | 4/2008 |
| DE | 102007022361 A1 | 11/2008 |
| DE | 102010006105 A1 | 8/2011 |
| DE | 102010042278 A1 | 4/2012 |
| DE | 102011121696 A1 | 6/2013 |
| DE | 102012001307 A1 | 7/2013 |
| WO | 02059544 A1 | 8/2002 |
| WO | 2014000738 A2 | 1/2014 |

OTHER PUBLICATIONS

International Search Report and Written Opinion issued in PCT/EP2016/060073, dated Jul. 18, 2016, 18 pages with English translation.

* cited by examiner

DEVICE AND METHOD FOR SPATIALLY MEASURING SURFACES

CROSS-REFERENCE TO RELATED APPLICATION

This application is a national phase application of PCT Application No. PCT/EP2016/060073, internationally filed May 4, 2016, which claims priority to German Application No. 10 2015 208 285.7, filed May 5, 2015, all of which are herein incorporated by reference in their entirety.

TECHNICAL FIELD

The disclosure relates to a device for spatially measuring surfaces, with a projector and two cameras, as well as to a method for spatially measuring surfaces, said method able to be carried out by the device.

BACKGROUND

Methods for the contact-free measurement of surfaces, with which methods a sequence of strip patterns which are of the same strip direction and which are formed from a multitude of strips is projected by way of a projection device onto a surface to be measured, are known from the state of the art, wherein a picture of the surface is recorded by each of two cameras during the projecting of each of the strip patterns. Corresponding points in picture planes of the camera are then identified by way of the strip patterns which are projected onto the surface, whereupon spatial coordinates of the surface points on the surface are determined by way of triangulation on the basis of the points identified as being corresponding.

Such methods are known e. g from the documents DE 10 2007 022 361 A1 and DE 10 2006 049 695 A1. A common design of such methods envisages some of the projected strip patterns being phase-shifted strip patterns with a sinusoidal brightness course which permit the assignment of a phase value to each point on the surface, wherein some further ones of the projected strip patterns define a grey code which permits an ambiguity which yet remains after determining the phase values to be resolved.

One difficulty which results with such triangulation methods based on pattern projection lies in a relative large number of patterns having to be projected and according many pictures having to be taken, so that the corresponding or homologous points in the picture planes can be indentified in an unambiguous manner and to an sufficiently accurate extent, which of course cannot be effected in an arbitrarily short time. For this reason, the measuring of surface contours by the methods known from the state of the art demands a relatively long measuring duration. This is disadvantageous in many applications, particularly if moved surfaces are to be measured or of a hand-held device is to be used for this.

SUMMARY

It is therefore an object of the disclosure to disclose a device, with which surfaces can be measured in a contact-free manner and as accurately as possible, wherein an as short as possible measuring time should be sufficient for measuring a surface. It is further an object of the disclosure to develop a corresponding method which permits a contact-free measurement of a surface contour with a high accuracy within an extremely short measuring time.

Embodiments of the device for spatially measuring surfaces include a projector for projecting patterns into an object space, two cameras for recording pictures of a surface in the object space, said surface to be measured, and a control and evaluation unit for activating the cameras and for evaluating the pictures recorded by these. Here, the projector includes a light source, a projections lens and at least one rotatably arranged pattern structure as an imaging element, as well as a drive for rotating the at least one pattern structure, wherein the control and evaluation unit is configured to carry out the following steps:
- activating the cameras for simultaneously recording of pictures at each of a multitude of successive points in time of recording, so that a sequence of brightness values is acquired for points in picture planes of the cameras,
- identifying corresponding points in the picture planes of the cameras by way of evaluating a correlation function between the sequences of brightness values acquired for potentially corresponding points and maximizing a value of a thus formed correlation, and
- determining spatial coordinates of surface points on the surface by way of triangulation on the basis of the points identified as being corresponding.

Here, the simultaneous recording of pictures with the two cameras means a recording at the same time, preferably with the same exposure time. Very decisive advantages are achieved by way of the design of the projector which is disclosed here and by way of the type of surface measurement and evaluation which results with the described device of the control and evaluation unit, wherein such advantages result from the subsequently explained interrelations.

An as large as possible number of pictures with different patterns projected onto the surface needs to be taken (recorded), in order to permit an adequately accurate measurement of the surface, and, required for this, to identify the homologous points in the picture planes of both cameras with an sufficient accuracy. On the other hand, all pictures which are necessary for the measuring should be taken in as short as possible time, from which it results that a high picture recording frequency and consequently necessary as short as possible exposure times and rapidly changing patterns are advantageous. At the same time, aperture openings of the lenses which are too large should be avoided, in order to permit an adequately high depth of field. In turn, this results in an as bright as possible illumination of the surface being advantageous. Summarizing, a bright light source, a high depth of field, rapid changes of the projected patterns and a recording of the pictures at a high picture frequency are therefore to be strived for. Narrow confines are placed upon a satisfactory fulfilment of all these requirements with regard to devices which are known from the state of art, not least because common measures for meeting these requirements are at odds with one another in the sense that with a given light power, an improved fulfilment of the one requirement renders the fulfilment of the other all the more difficult, whereas concerning commonly applied imaging elements for projectors, the light power cannot be arbitrary increased without avoiding damage due to heat or endangerment due to laser light.

The features of the disclosed method now permit all mentioned demands to be fulfilled to an unusual far extent. Firstly, patterns which change in a very short time can be projected by the use of at least one rotating pattern structure as an imaging element, so that relatively many pictures which show the surface with adequately different patterns in an illuminated manner can be taken in a very short time.

Here, it is advantageous that it is not necessary to stop the rotating, thus mechanically moved pattern structure and to accelerate it again, and this simplifies the realisation of a high picture frequency. The pattern structure can simultaneously be carried out without any problems such that—in contrast to for example a liquid crystal display or another digital imager—its heat sensitivity is adequate low, in order to permits extremely high light powers, which in turn permits an adequately bright illumination of the surface also for short exposure times and also given small aperture openings which are advantageous with regard to the depth of field. In turn, the disclosed evaluation of the pictures which envisages an identifying of the corresponding points in the picture planes by way of maximising values of a correlation function renders it possible to realise the spatial measuring by way of pattern projection also without the knowledge of the precise characteristics of the projected patterns. Indeed, for identifying the homologous points in the described manner, it is sufficient if the patterns change such that the sequences of brightness values which are detected for the different points are adequately different, which is also the case when the patterns and their temporal change are of a statistical or quasi-statistical nature.

An accordingly advantageous method for the spatial measurement of surfaces, said method being able to be carried out with the disclosed device, accordingly includes the following steps:
  projecting temporally changing patterns onto a surface to be measured, by way of a projector which includes a light source, a projection lens and at least one hereby rotating pattern structure as an imaging element,
  simultaneously recording a picture of the surface with each of two cameras at each of a multitude of successive recording points in time during the projecting, so that a sequence of brightness values is acquired for points in picture planes of the cameras,
  identifying corresponding points in the picture planes of the cameras by way of evaluating a correlation function between the sequences of brightness values acquired for potentially corresponding points and maximizing a value of the thus formed correlation,
  determining spatial coordinates of surface points on the surface by way of triangulation on the basis of the points indentified as being corresponding.

The identifying of the corresponding points or homologous points—these terms are applied synonymously—can be effected by way of, for each of a multitude of points in the picture plane of a first of the two cameras, searching for the point which corresponds to this, on a corresponding epipolar line in the picture plane of the second camera, by way of the correlation function between the sequence of brightness values which has been acquired for the respective point in the picture plane of the first camera and the sequences of brightness values which have been acquired for the points on the corresponding epipolar line in the picture plane of the other camera being evaluated. The actual homologous point can then be found as the point in the picture plane of the second camera, for which the hence formed thus correlation assumes the highest value, thus for which the correlation function assumes a maximum and the value of the correlation is consequently maximised. Here, the respective corresponding point can be determined in a subpixel-accurate manner, thus including subpixel interpolation. The search for the corresponding point in the picture plane of the second camera, for each point in the picture plane of the first camera, can therefore be limited to points which lie on the mentioned epipolar line, since only these are considered as potentially corresponding to the respective point in the picture plane of the first camera. The control and evaluation unit can therefore be configured to limit the step of identifying corresponding points to pairs of points which lie on corresponding epipolar lines.

The correlation function can be arbitrarily selected in wide boundaries and merely needs to display the characteristic which can be used for correlation functions, of assuming an extreme—such as a maximum—given identity of the sequences which are compared by way of evaluating the correlation function and getting closer to this extreme, the more similar the compared sequences are. If this extreme is a minimum due to the definition of the correlation function, then the locating of this minimum is also to be understood as a maximisation in the context of the present application.

Particularly high light powers or illumination densities and consequently high picture frequencies can be achieved if the projector includes an arc lamp or gas discharge lamp, for example a xenon gas discharge lamp or a metal vapour lamp as a light source. These advantageously produce non-coherent light, so that one can make do without particularly safety precautions for the eyes as is common with laser sources. Other powerful and preferably non-coherent light sources can of course also be used as a light source of the projector.

At least one rotating disc or at least one rotating cylinder surface—thus a drum-lie element—or a closed belt which is led around at least two rollers and rotates amid the rotation of the rollers in the belt direction can be used for example as a pattern structure of the projector. A very simple construction of the projector results with this. It is to be noted that a closed, revolving belt is to be understood as rotating in the context of the present document. This belt can e.g. be a film.

The pattern structure can comprise binary patterns or patterns with a grey-scale-like course. On using binary patterns, a grey-scale course can be achieved in the recorded pictures by way of a motion blur which in any case can hardly be avoided but is not harmful and is even advantageous. The pattern structure or each of the pattern structures can be realised e.g. as steel sheet with suitable openings or as a chromium mask on a glass substrate.

The at least one pattern structure which is used for producing the pattern can comprise an aperiodical strip pattern with strips which are orientated in the radial direction of the disc or parallel to an axis or symmetry of the cylinder surface or transversely to the belt movement direction. The patterns which are produced herewith then also display a strip structure, which is sufficient, particularly if the two cameras are arranged at a distance to one another in a direction transverse to these strips and if the epipolar line geometry is utilised in the manner explained above.

One can envisage the strip pattern have a sinusoidal brightness course in an environment of each of the strips or of some of the strips, wherein a spatial frequency of the strip pattern is not constant in a direction transverse to the strips. Binary strip patterns with quasi-statistically changing strip widths and strip distances are also alternatively possible. With all these variants, it is particularly simple to succeed in the sequences of brightness values which are detected for the different points in the recorded pictures being adequately different, which in turn permits a very precise identification of homologous points—and such as accurate to the subpixel, thus including subpixel interpolation—by way of maximising the mentioned correlation.

However, arbitrary other patterns can also be used in very wide limits and accordingly differently fashioned pattern structures, whose precise structure does not even have to be known, since it is sufficient if the detected sequences of brightness values for the various points on the surface significantly differ, which e.g. is practically unavoidable when statistical or quasi-statistical patterns are projected.

Often, the at least one pattern structure is driven such that it continuously rotates at a uniform speed during the projecting of the pattern and the recording of the pictures. Here, a plurality of pictures can be recorded with each of the cameras during a single complete revolution of the at least one pattern structure. The drive which is provided for rotating the at least one pattern structure can therefore be configured to continuously rotate the at least one pattern structure at a uniform speed, whereas the control and evaluation unit can be configured to activate the cameras such that a multitude of the pictures is recorded with each of the cameras during a single complete revolution of the at least one pattern structure or even during less than one complete revolution. Here, it can be sufficient if the projected pattern moves further between two successive recordings by significantly less that a complete picture width—with respect to the fields of vision of the camera. A high picture frequency can therefore be achieved without time being lost by way of braking and accelerating the at least one pattern structure or disadvantageous shaking movements being caused. In particular, the normally required long pauses between two exposures with a start-stop movement regime are dispensed with.

The pattern structure can be realised in a particularly simple manner if it has a binary pattern for producing the patterns which are projected into the object space. One can therefore envisage the pattern projected onto the surface being produced by a binary pattern of the at least one pattern structure. If the pattern structure is continuously rotated further on recording the pictures, then in this case too patterns with grey scales or a constant brightness course effectively result, since the pictures are each recorded with a finite exposure time, so that the finally acquired patterns result by way of temporal integration. For this reason, when using suitable binary patterns, the corresponding points can be identified just as accurately as with the use of patterns with a continuous course. The binary patterns which can be realised by opaque regions against a transparent background can be designed e.g. such that an aperiodical strip pattern of the type described above results after the temporal integration over the exposure times. The binary patterns for their part can be periodical strip patterns or also patterns with— e.g. with a disc-like pattern structure from the inside to the outside—branching strips or irregularly arranged points or spots.

In particular, by way of the described measures it is possible for the pictures to be recorded at a picture frequency of more than 500 Hz or even more than 1 kHz, such as with a picture frequency of between 1 kHz and 100 kHz, which is why the control and evaluation unit can be configured to activate the cameras into taking the pictures with an accordingly high picture frequency.

For example, an exposure time which is between 5% and 50% of a temporal interval between the directly consecutive recording points in time, such as between 10% and 50% of this temporal interval, can be used for recording each of the pictures. Here, the picture frequency corresponds to the inverse of the mentioned temporal interval. On account of this, on the one hand an adequately long exposure is still realised, whist an illumination of the surface which is averaged over the exposure time and with adequately distinctive patterns which are adequately different from picture to picture can yet be simultaneously realized.

One can envisage the projector comprising two of the pattern structures or two simultaneously through-illuminated parts of the pattern structure which are movable relative to one another by way of the drive for producing temporally variable Moiré patterns. The projected patterns can therefore be produced as temporally changing Moiré patterns by way of two of the pattern structures or by way of two simultaneously through-illuminated parts of the pattern structure of the projector, wherein the two pattern structures or the two simultaneously through-illuminated parts of the pattern structure are moved relative to one another. The two pattern structures can possibly be designed for example in the form of two discs which are arranged tightly to one another or two cylinder surfaces which are arranged in one another, said discs and cylinder surfaces rotating in opposite directions or differently quickly. The two simultaneously through-illuminated parts of the pattern structure in contrast can e.g. be two oppositely moved sections of the same closed belt. With all these variants, one can succeed in the projected patterns, in this case thus the Moiré patterns, moving and consequently changing significantly more quickly due to the relative movement between the through-illuminated pattern structures or parts of the pattern structure, than would be the case with a single, pattern structure rotating in an equally rapid manner. A lateral speed of the pattern superposition resulting in the respective Moiré pattern and which is very much larger than the actual movement speed of the individual patterns, whose superposition leads to the Moiré pattern, can therefore be achieved. This too simplifies the realisation of a very high picture frequency given simultaneously adequately high differences between the patterns which are projected during the recording of the individual pictures.

BRIEF DESCRIPTION OF THE DRAWINGS

Embodiment examples of the disclosure are hereinafter explained by way of the FIGS. 1 to 7. There are shown in.

DETAILED DESCRIPTION

Figure 1:
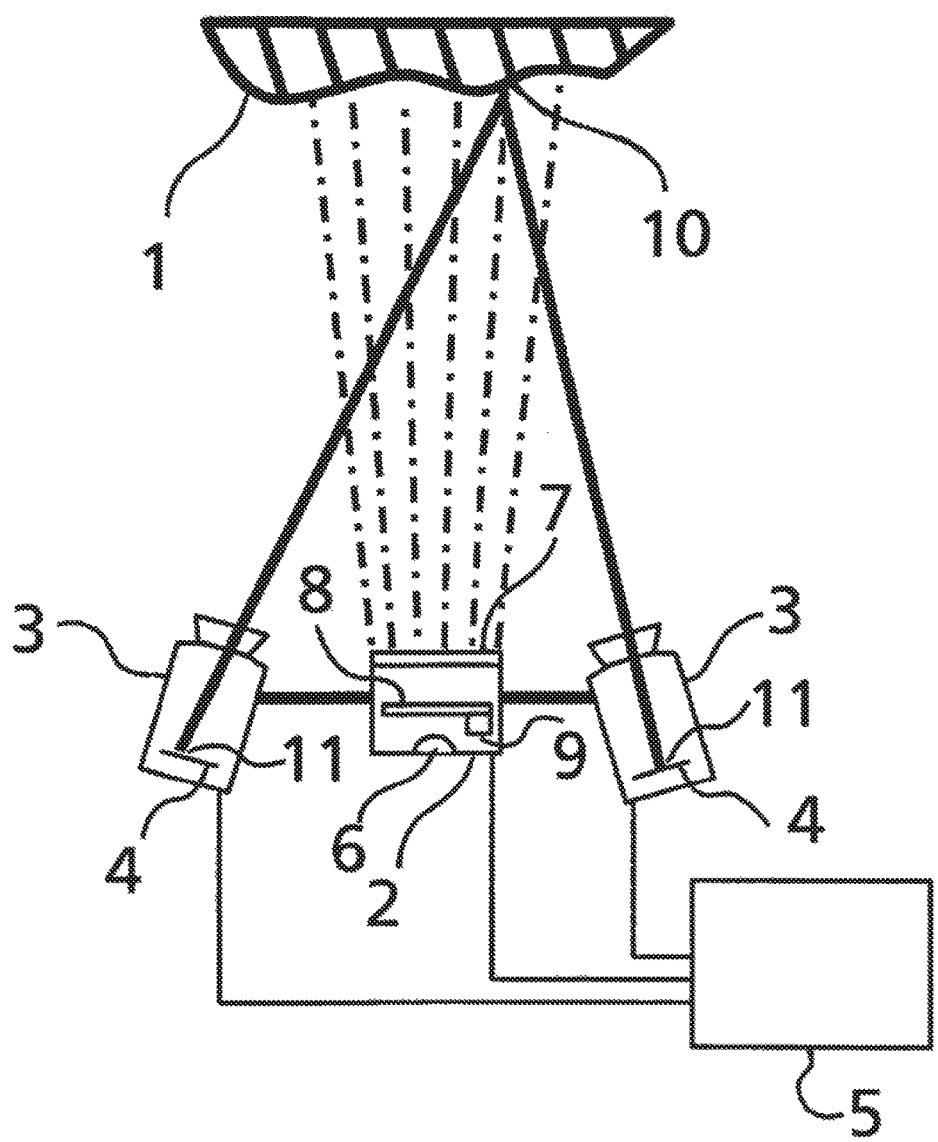
FIG. 1 in a schematic representation, a view of the device for spatially measuring surfaces, according to embodiments of the disclosure.

A device which is suitable for the contact-free, spatial measuring of surfaces is shown in FIG. 1 by way of example. A test body with a surface 1 which is to be measured is represented in an object space in front of this device. The device includes a projector 2 which is only represented in a schematic manner here, for projecting patterns into the object space, as well as two cameras 3 for recording pictures of the surface 1. Each of these cameras 3 has a picture sensor 4 which is arranged in a picture plane of the respective camera 3. Finally, the device also includes a control and evaluation unit 5 for activating the projector 2 and the camera 3 and for evaluating the pictures which are recorded by these. The cameras 3 are fixedly connected to one another and therefore have a fixed and known arrangement and orientation relative to one another. An inner geometry of the device which is known on account of this fact permits a contact-free measuring of the surface 1 by way of a triangulation method which is described in more detail further below.

The projector 2 includes a very powerful light source 6 which can be e.g. a xenon gas discharge lamp or a metal vapour lamp or a light arc lamp or an LED. The projector moreover includes a projection lens 7 and at least one rotatable pattern structure 8 as well as a drive 9 which drives the pattern structure such that it continuously rotates with a uniform rotation speed.

On measuring the surface 1 with the represented device, patterns which temporally change are projected onto the surface 1 by way of this. These patterns each have a strip structure with at least largely parallel strips of a different width and irregular distances, wherein the strips are orientated perpendicularly to the plane of the drawing and are consequently perpendicular to epipolar lines which are defined by the geometry of the device in the picture planes of both cameras 3 which are spanned by the picture sensors 4.

The cameras 3 are now activated by the control and evaluation unit 5 such that each of these cameras 3 during the projecting of the patterns and at a multitude of successive points in time each take a picture of the surface 1 in a simultaneous manner, thus at the same time as the respective other camera 3 and each with the same exposure time. A succession of pictures is therefore recorded with each of the cameras 3, of which pictures each is to be assigned to one of the mentioned points in time and a consequently to a pattern which is projected at the respective point in time—more precisely averaged over the respective exposure time. Here, the cameras 3 are activated such that a multitude of pictures is already taken by each of the two cameras 3 during a single, complete or even only partial revolution of the at least one pattern structure 8. For this, the pictures are taken or recorded at a picture frequency such as between 1 kHz and 100 kHz, for example about 10 kHz, wherein an exposure time for each of the pictures is between 5 µs and 50 µs.

Corresponding or homologous points in the picture planes of the two cameras 3 are now identified by way of evaluating the recorded pictures by way of the correspondingly programmed control and evaluation unit 5 and specifically by way of the patterns projected onto the surface 1. Here, those points in the picture planes of the two cameras 3, upon which an equal surface point of the surface 1 is imaged are defined as being homologous or corresponding. This is represented in FIG. 1 by way of example for a selected surface point 10 which is imaged upon the two corresponding points 11. For identifying the corresponding points, one utilises the fact that for each point in the picture planes of each of the cameras 3, due to the temporally changing pattern there results a sequence of brightness values which manifests itself in the sequence of pictures which is recorded by the respective camera 3 and which by way of this is detected for each of the points.

The at least one pattern structure 8 is designed such that these sequences of brightness values are quasi statistical and in particular differ from surface point to surface point at least perpendicularly to the strip direction. Utilising this, the corresponding points are now each identified by way of maximising a correlation which is formed between the sequences of brightness values which are detected for the potentially corresponding points. For this, a correlation function which can be arbitrarily selected in large limits can be evaluated for a multitude of pairs of brightness value sequences, and the result of this evaluation—specifically a correlation value which is determined by way of this for each pair of compared points—is maximised for locating the pairs of corresponding or homologous points. The correlation or the correlation function which is to be maximised is formed or evaluated only for points on corresponding epipolar lines whilst using epipolar geometry. For each point in the picture plane of the first of the two cameras 3, one therefore only searches for the corresponding point on the corresponding epipolar line in the picture plane of the remaining camera 3. The corresponding points can hereby be found with a spatial resolution which is greater than a picture resolution which is defined by a pixel matrix of the pictures sensors 4, since brightness values and accordingly sequences of brightness values, by way of interpolation, can also be formed for points which do not exactly correspond to a pixel position.

Spatial coordinates of the surface points of the surface 1 are now determined by way of triangulation by the control and evaluation unit 5 on the basis of the points in the picture planes of the cameras 3, said points identified as being corresponding, and this can be effected by way of using simple trigonometric relationships on account of the known geometry of the device.

By way of different examples, the following FIGS. 2 to 7 show how the projector can be designed. The same or corresponding features here are provided with the same reference numerals.

Embodiments of the projector 2 with which the pattern structure 8 is designed as a rotating disc are shown in FIG. 1. The pattern structure 8 here is realised by a steel sheet with openings or as a chromium mask on a glass substrate. Here, the pattern structure 8 includes an aperiodical strip pattern with strips which are orientated in the radial direction of the disc. The cameras 3 which are not represented here are hereby arranged such that they are distanced to one another in a direction transverse to the strips which are projected by way of this. For this, the cameras 3 are placed in a horizontal plane to the right and left next to the projector 2. The strip pattern which is carried by the pattern structure 8 either has a sinusoidal brightness course in the environment of each of the strips, wherein a spatial frequency of the strip pattern is not constant in a direction transverse to the strips, or a it is a binary strip pattern with quasi-statistically changing strip widths and strip distances.

Figure 2:
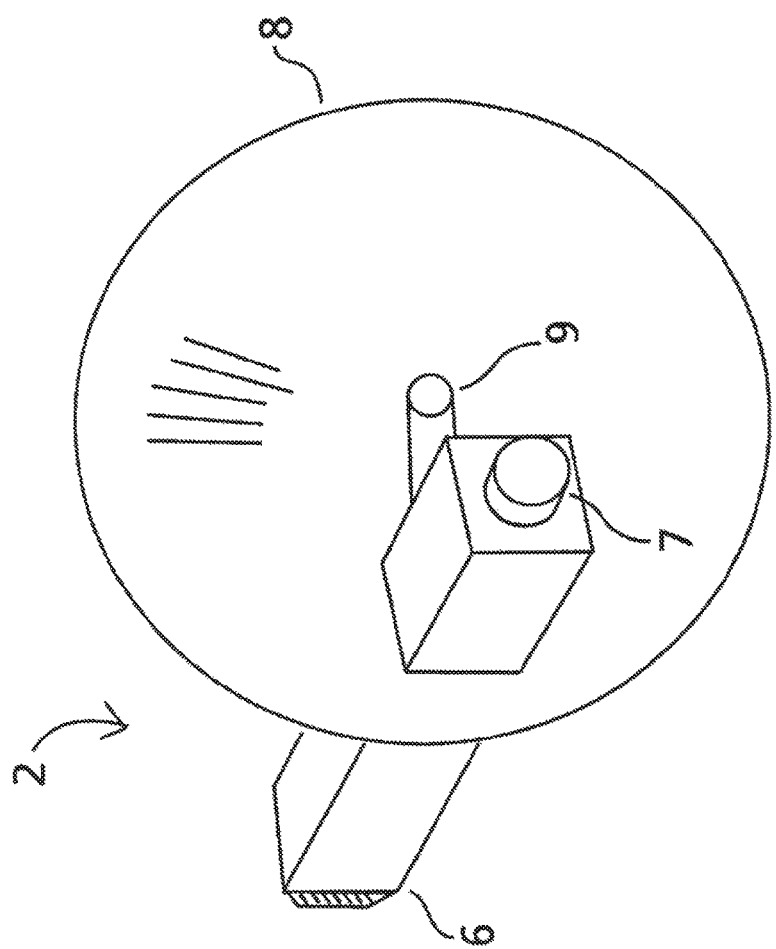
FIG. 2 in a perspective representation, a projector of this device, according to embodiments of the disclosure.
Figure 3:
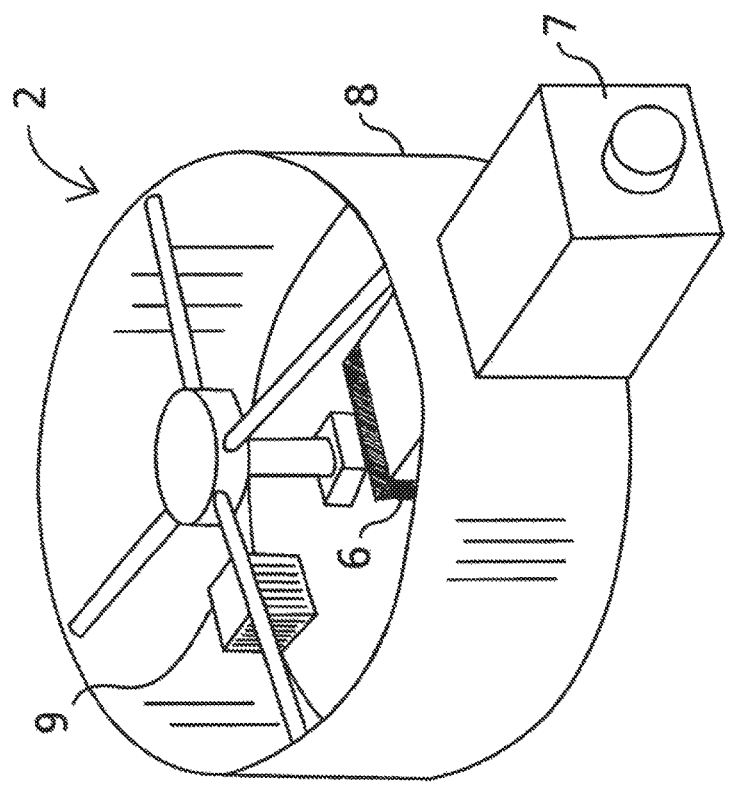
FIG. 3 in a perspective representation, a differently designed projector of a modification of this device, according to embodiments of the disclosure.

FIG. 3 shows embodiments of the projector 2. Here, the pattern structure 8 has the shape of a rotating cylinder surface, thus is designed in a drum-like manner. Here, the pattern structure 8 carries an aperiodical strip pattern with strips which are orientated parallel to an axis of symmetry and rotation axis of the pattern structure. Otherwise, the same as for the embodiments described previously by way of FIG. 2 applies to this projector.

Figure 4:
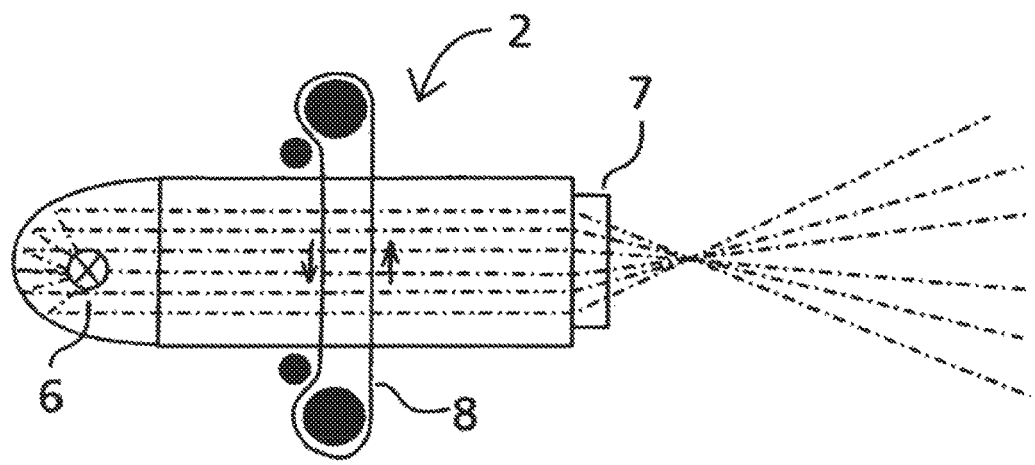
FIG. 4 as a sectioned drawing, embodiments of a projector of a further modification of this device which is obtained with this projector, according to embodiments of the disclosure.

FIG. 4 shows a projector 2 which can be used instead of the previously described embodiments and differs from these in that the pattern structure 8 in this case is given by a closed, rotating belt which for this is led over four rollers. One of these rollers can be driven by a drive which is not represented here, in order to effect a uniform revolving of the belt, which is illustrated in FIG. 4 by two arrows. The belt carries an aperiodic strip pattern of the previously described type, wherein the strips of the strip pattern in this case are orientated transversely to the belt direction, thus perpendicular to the plane of the drawing. As can be recognised in FIG. 4, two sections of the belt which move at a close distance to one another in the opposite direction through a beam path of the projector 2 are beamed through at every point in time. Moiré patterns which this projector 2 projects into the object space and which move significantly more quickly in the lateral direction than the individual constituents of the projected patterns which are caused by the individual ones of the two beamed-through sections arise by way of this. With a given revolving speed of the belt, the projected patterns change particularly rapidly with these embodiments, which is why the picture frequency can be selected very high even with a comparatively low revolving speed.

Figure 5:
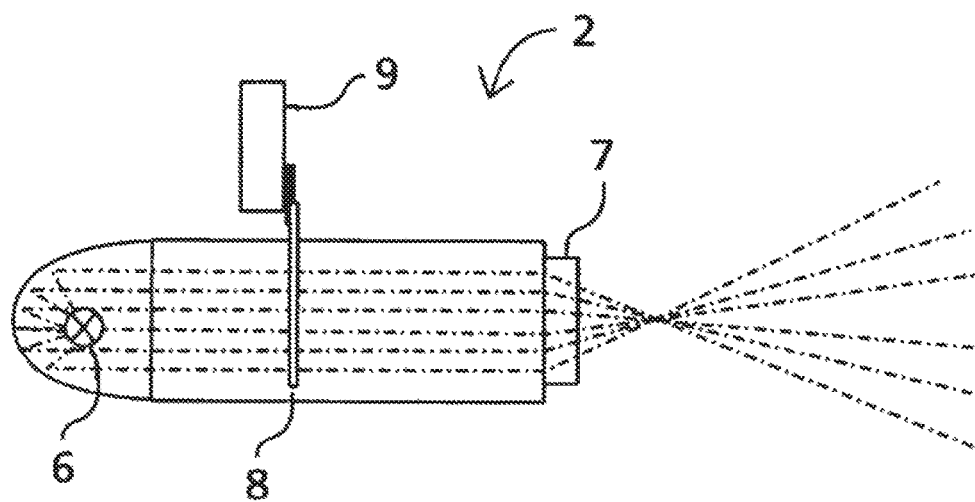
FIG. 5 as a sectioned drawing, a differently designed projector which can be used in the device for spatially measuring surfaces instead of projectors from the preceding figures, according to embodiments of the disclosure.

Embodiments of the projector 2 are represented in FIG. 5. Here, the pattern structure 8 is again designed as a disc, similarly to the embodiments of FIG. 2, wherein the drive 9 in this case is designed according to the principle of an angle grinder. The pattern structure 8 undergoes a very irregular rotational movement on account of this, which can be favourable for the described triangulation method.

Figure 6:
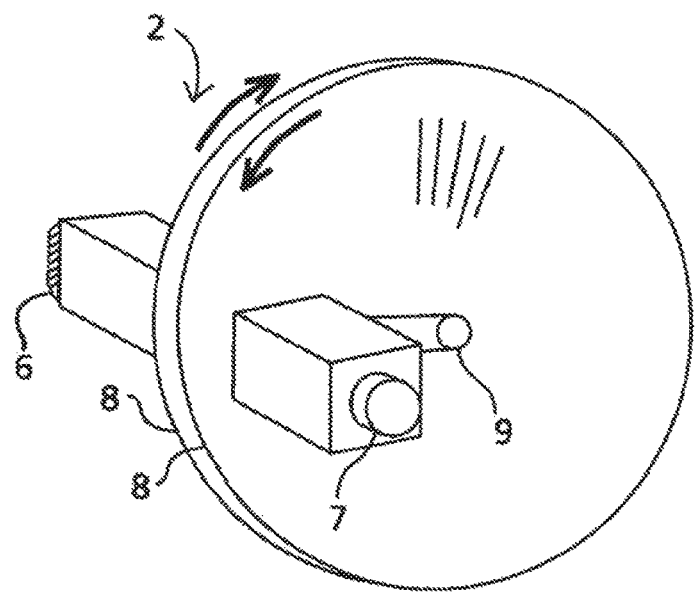
FIG. 6 in a perspective representation, a modification of the projector of FIG. 2, which can likewise be used in the otherwise equal device, according to embodiments of the disclosure.
Figure 7:
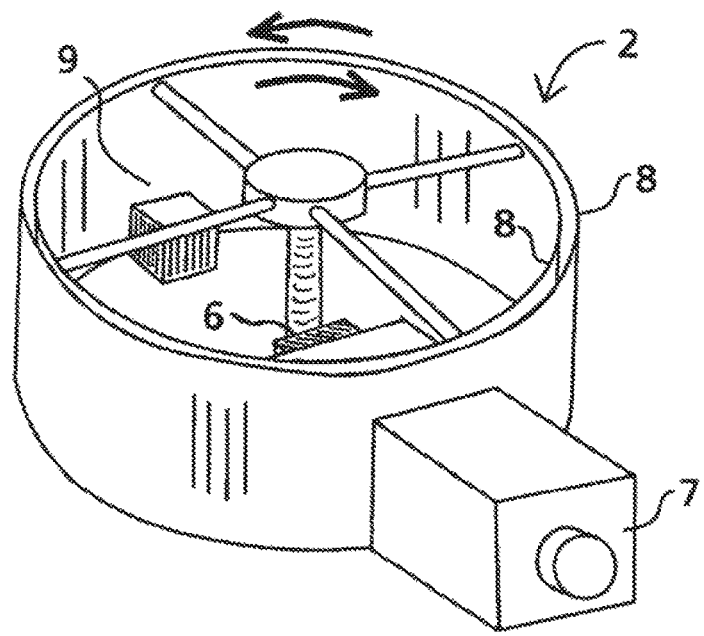
FIG. 7 in a corresponding representation, yet a projector which is a modification of the projector of FIG. 3 and which can also be used in the device for spatially measuring surfaces instead of the other shown projectors, according to embodiments of the disclosure.

Finally, two further projectors 2 which are modifications of the embodiments of FIGS. 2 and 3 are represented in the FIGS. 6 and 7. The projectors 2 of FIGS. 6 and 7 only differ from these in that they each comprise two pattern structures 8 which are each designed similarly to the pattern structure 8 of FIG. 2 and FIG. 3 respectively and which rotate in opposite directions. This is illustrated in FIGS. 6 and 7 by two arrows. Instead of this, it would also be possible for the two pattern structures 8 to rotate in the same direction, but at different rotation speeds. Moiré patterns which change very rapidly even given a comparatively slow rotation movement of the pattern structures 8 arise due to this, similarly to the embodiments of FIG. 4.

The pattern structures 8 of the different embodiments could also each have patterns of a different fashion, e.g. patterns with branching strips or with irregularly distributed spots or points, instead of the strip patterns which are mentioned here by way of example, wherein the patterns in particular can each be of a binary nature. Patterns with constant brightness courses also effectively result on the surface 1 due to the finite exposure times of the individual recordings. In embodiments, the patterns on the pattern structure 9 will each be aperiodical in a movement direction of movement of the pattern structure 8 which is given by the rotation, in order to permit a reliable identification of corresponding points with the help of described correlation.

The invention claimed is:

1. A device for spatially measuring surfaces, comprising:
    a projector for projecting patterns into an object space, two cameras for recording pictures of a surface in the object space, said surface to be measured, and a control and evaluation unit for activating the cameras and for evaluating the pictures recorded by these,
    wherein the projector comprises a light source, a projection lens and at least one rotatably arranged pattern structure as an imaging element, as well as a drive for rotating the at least one pattern structure,
    wherein the at least one pattern structure has a form of one of a rotatable disc, a rotatable cylinder surface, and a closed rotating belt which is led around at least two rollers and rotatable in a longitudinal direction of the belt by rotating the rollers,
    wherein the pattern structure comprises an aperiodic strip pattern with strips oriented in a radial direction of the disc or parallel to a symmetry axis of the cylinder surface or transversely to the longitudinal direction of the belt,
    wherein the control and evaluation unit is configured to carry out the following steps:
    activating the cameras for simultaneously recording pictures at each of a multitude of successive points in time of recording, so that a sequence of brightness values is acquired for points in picture planes of the cameras;
    identifying corresponding points in the picture planes of the cameras, by way of evaluating a correlation function between the sequences of brightness values acquired for potentially corresponding points and maximizing a value of a thus formed correlation; and
    determining spatial coordinates of surface points on the surface by way of triangulation on the basis of the points identified as being corresponding.

2. The device according to claim 1, characterised in that the strip pattern has a sinusoidal brightness course in an environment of each of the strips or of some of the strips, wherein a spatial frequency of the strip pattern is not constant in a direction transverse to the strips.

3. The device according to claim 1, characterised in that the drive is configured to rotate the at least one pattern structure in a continuous manner at a uniform speed, wherein the control and evaluation unit is configured to activate the cameras such that a multitude of pictures is recorded by each of the cameras during a single complete or partial revolution of the at least one pattern structure.

4. The device according to claim 1, characterised in that the pattern structure comprises a binary pattern for producing the patterns which are projected into the object space.

5. The device according to claim 1, characterised in that the control and evaluation unit is configured to activate the camera for recording the pictures at a picture frequency of at least 500 Hz.

6. The device according to claim 1, characterised in that the cameras and the control and evaluation unit are configured such that an exposure time which is used for recording each of the pictures is between 5% and 50% of a temporal interval between the directly consecutive recording points in time.

7. The device according to claim 1, characterised in that the projector comprises two of the pattern structures or two simultaneously through-illuminated parts of the pattern structure, said pattern structures or parts of the pattern structure being movable relative to one another by the drive for producing temporally changing Moiré patterns.

8. The device according to claim 1, characterised in that the light source is an arc lamp or a gas discharge lamp.

9. A method for spatially measuring surfaces, comprising the following steps:
    projecting temporally changing patterns onto a surface to be measured, by way of a projector which comprises a light source, a projection lens and at least one hereby rotating pattern structure as an imaging element;
    simultaneously recording a picture of the surface with each of two cameras at each of a multitude of successive recording points in time during the projecting, so that a sequence of brightness values is acquired for points in picture planes of the cameras;

identifying corresponding points in the picture planes of the cameras by way of evaluating a correlation function between the sequences of brightness values acquired for potentially corresponding points and maximizing a value of the thus formed correlation; and determining spatial coordinates of surface points on the surface by way of triangulation on the basis of the points identified as being corresponding, wherein the at least one pattern structure used as the imaging element for projecting the patterns has a form of one of a rotating disc, a rotating cylinder surface, and a closed rotating belt which is led around at least two rollers and rotated in a longitudinal direction of the belt by rotating the rollers, wherein the patterns are produced by an aperiodic strip pattern of the imaging element with strips oriented in a radial direction of the disc or parallel to a symmetry axis of the cylinder surface or transversely to the longitudinal direction of the belt.

10. The method according to claim 9, characterised in that the strip pattern has a sinusoidal brightness course in an environment of each of the strips or of some of the strips, wherein a spatial frequency of the strip pattern is not constant in a direction transverse to the strips.

11. The method according to claim 9, characterised in that the at least one pattern structure is continuously rotated at a uniform speed by way of a drive during the projecting of the patterns and the recording of the pictures, wherein a multitude of the pictures is recorded with each of the cameras during a single complete revolution or partial revolution of the at least one pattern structure.

12. The method according to claim 9, characterised in that the patterns which are projected onto the surface are produced by a binary pattern of the at least one pattern structure.

13. The method according to claim 9, characterised in that the pictures are recorded at a picture frequency of at least 500 Hz.

14. The method according to claim 9, characterised in that an exposure time which is between 5% and 50% of a temporal interval between the directly consecutive recording points in time is used for recording each of the pictures.

15. The method according to claim 9, characterised in that the patterns are produced as temporally changing Moiré patterns by way of two of the pattern structures or by way of two simultaneously through-illuminated parts of the pattern structure of the projector, wherein the two pattern structures or the two simultaneously through-illuminated parts of the pattern structure are moved relative to one another.

* * * * *